United States Patent [19]

Shino et al.

[11] Patent Number: 5,697,340
[45] Date of Patent: Dec. 16, 1997

[54] ENGINE COLD STARTUP CONTROLLER

[75] Inventors: Toshikazu Shino, Chigasaki; Kimiyoshi Nishizawa, Yokohama, both of Japan

[73] Assignee: Nissan Motor Co., Ltd., Kanagawa, Japan

[21] Appl. No.: 726,207

[22] Filed: Oct. 4, 1996

[30] Foreign Application Priority Data

Oct. 12, 1995 [JP] Japan .................................. 7-263824

[51] Int. Cl.[6] .................................................. F02P 5/15
[52] U.S. Cl. ........................ 123/421; 123/422; 123/424
[58] Field of Search .............................. 123/421, 422, 123/424

[56] References Cited

U.S. PATENT DOCUMENTS 4,351,297  9/1982  Suematsu ........................ 123/424 X
4,790,280  12/1988  Umehara et al. ................. 123/424 X
5,535,586  7/1996  Ohta et al. ...................... 123/424 X
5,540,202  7/1996  Cullen et al. .................... 123/424

FOREIGN PATENT DOCUMENTS

5-272394  10/1993  Japan .

Primary Examiner—Tony M. Argenbright
Attorney, Agent, or Firm—Lowe, Price, LeBlanc & Becker

[57] ABSTRACT

A fuel supply amount to a spark ignition engine is increased and an ignition timing of an air-fuel mixture is retarded during cold startup. At the same time, it is determined whether or not the air-fuel ratio of the air-fuel mixture is richer than a predetermined level, and retardation of the ignition timing is prohibited when it is richer than this predetermined level. In this way, retardation of ignition timing is prohibited when the air-fuel ratio is very rich immediately after startup. Combustion immediately after startup is therefore stable, and the discharge amount of HC is effectively reduced.

8 Claims, 8 Drawing Sheets

ENGINE COLD STARTUP CONTROLLER

FIELD OF THE INVENTION

This invention relates to control of an air-fuel ratio and an ignition timing during cold startup of an engine.

BACKGROUND OF THE INVENTION

Tokkai Sho 5-272394 published by the Japanese Patent Office in 1993 discloses how toxic exhaust components are reduced by retarding the ignition timing of fuel so as to increase exhaust temperature in order to activate a catalyst while fuel supply to the engine is increased so as to maintain drivability.

Figure 8:
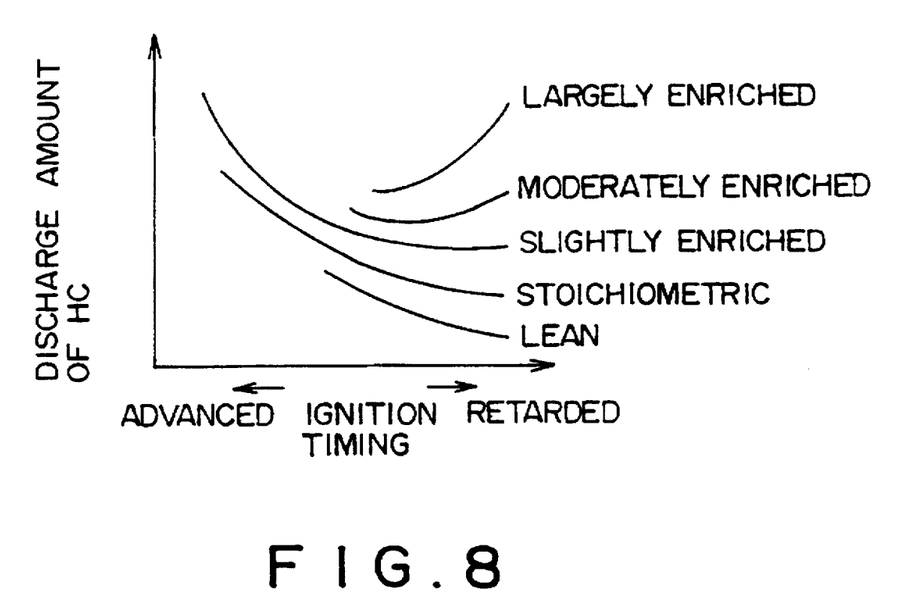
FIG. 8 is a graph showing the relation between ignition timing and HC discharge amount according to air-fuel ratio.

In general, when the ignition timing is retarded, exhaust temperature increases and at the same time, the post-combustion, i.e., oxidation of unburned hydrocarbon (HC) after combustion, is promoted so the discharge amount of HC is reduced. However, as shown by FIG. 8, if the ignition timing is retarded when the air-fuel ratio is enriched, combustion is impaired and the discharge amount of HC actually increases.

Figures 9A, 9B:
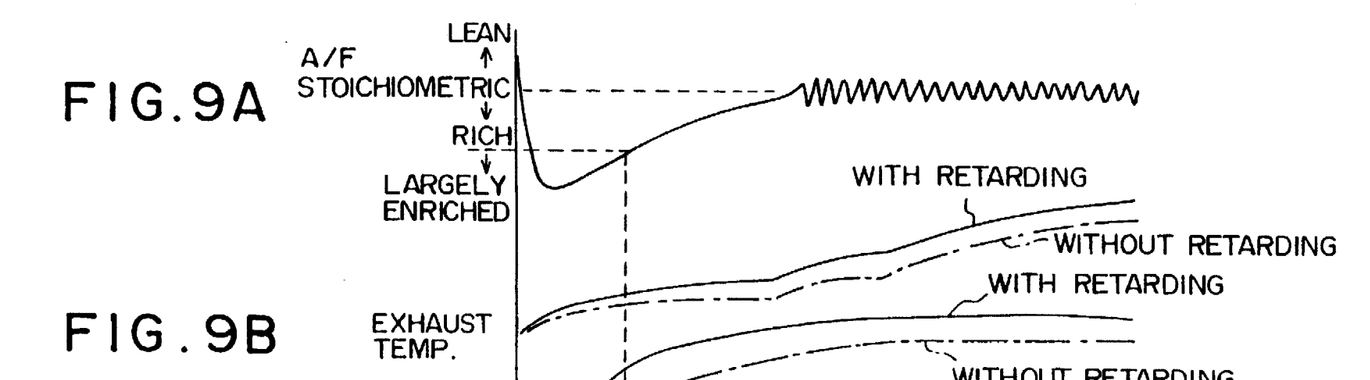
FIGS. 9A–9C are timing charts showing exhaust temperature and HC cumulative discharge amount in a controller according to the prior art.
Figure 9C:
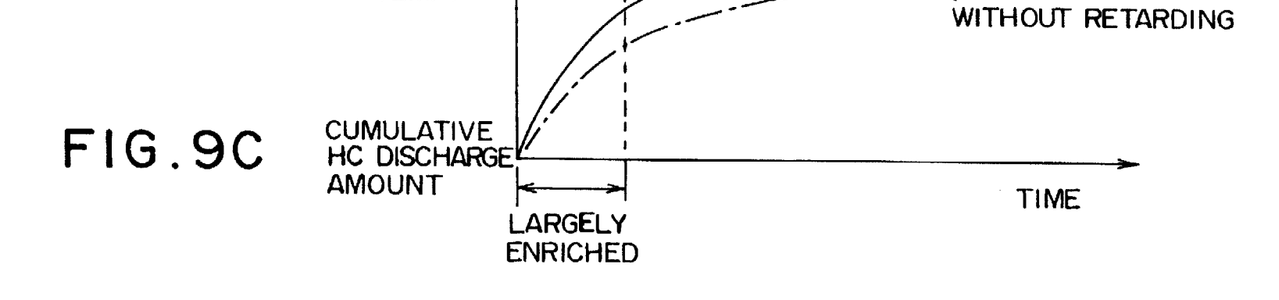

Therefore, according to the prior art, the amount of HC discharged actually increased as shown in FIG. 9C although the catalyst was activated earlier as shown in FIG. 9B by retarding the ignition timing.

FIGS. 9A–9C show the exhaust temperature and total HC-discharge amount when ignition timing is retarded and when it is not. As shown in FIG. 9A, the HC discharge amount while the air-fuel ratio is largely enriched, is greater when the ignition timing is retarded. After the rich period, the HC discharge amount decreases when the ignition timing is retarded, but as the cumulative discharge amount until then is large, there is a strong possibility that the total discharge amount of HC from engine startup until engine warmup is completed will actually increase due to retardation of the ignition timing.

SUMMARY OF THE INVENTION

It is therefore an object of this invention to suppress the increase of HC discharge due to retardation correction of the ignition timing during cold startup.

It is a further object of this invention to accurately and easily evaluate a largely enriched state of the air-fuel ratio.

It is a further object of this invention to cause the ignition timing to vary smoothly when the ignition timing is corrected.

In order to achieve the above objects, this invention provides a controller for use with a spark ignition engine comprising a mechanism for increasing fuel supply to the engine so as to make an air-fuel ratio of air-fuel mixture supplied to the engine richer than a stoichiometric air-fuel ratio during cold startup of the engine, a mechanism for retarding an ignition timing of the air-fuel mixture during cold startup, a mechanism for determining whether or not the air-fuel ratio of the air-fuel mixture is richer than a predetermined level which is richer than the stoiciometric air-fuel ratio, and a mechanism for prohibiting retardation of ignition timing by the retarding mechanism when the air-fuel ratio is richer than the predetermined level.

It is preferable that the determining mechanism comprises a mechanism for determining whether or not an increase amount due to the increasing mechanism is greater than a predetermined value.

It is also preferable that the determining mechanism comprises a mechanism for determining whether or not an elapsed time from startup of the engine has exceeded a predetermined value.

It is also preferable that the controller further comprises a mechanism for determining whether or not an idle running state of the engine has terminated, and a mechanism for gradually returning the ignition timing retarded by the retarding mechanism to a non-retarded state when the idle running state has terminated.

It is further preferable that the retarding mechanism further comprises a mechanism for gradually retarding the ignition timing at a first rate and wherein the gradually returning mechanism comprises a mechanism for returning the ignition timing at a second rate which is larger than or equal to the first rate.

It is still further preferable that the controller further comprises a mechanism for determining whether or not the engine is in a predetermined acceleration state, and a mechanism for immediately returning the ignition timing retarded by the retarding mechanism to the non-retarded state when the engine is in the predetermined acceleration state.

It is also preferable that the controller further comprises a mechanism for determining whether or not a cooling water temperature of the engine has exceeded a predetermined value, and a mechanism for gradually returning the ignition timing retarded by the retarding mechanism to a non-retarded state when the cooling water temperature has exceeded the predetermined value.

In this case also, it is preferable that the controller further comprises a mechanism for gradually retarding the ignition timing at a first rate and wherein the gradually returning mechanism comprises a mechanism for returning the ignition timing at a second rate which is larger than or equal to the first rate.

The details as well as other features and advantages of this invention are set forth in the remainder of the specification and are shown in the accompanying drawings.

Figure 1:
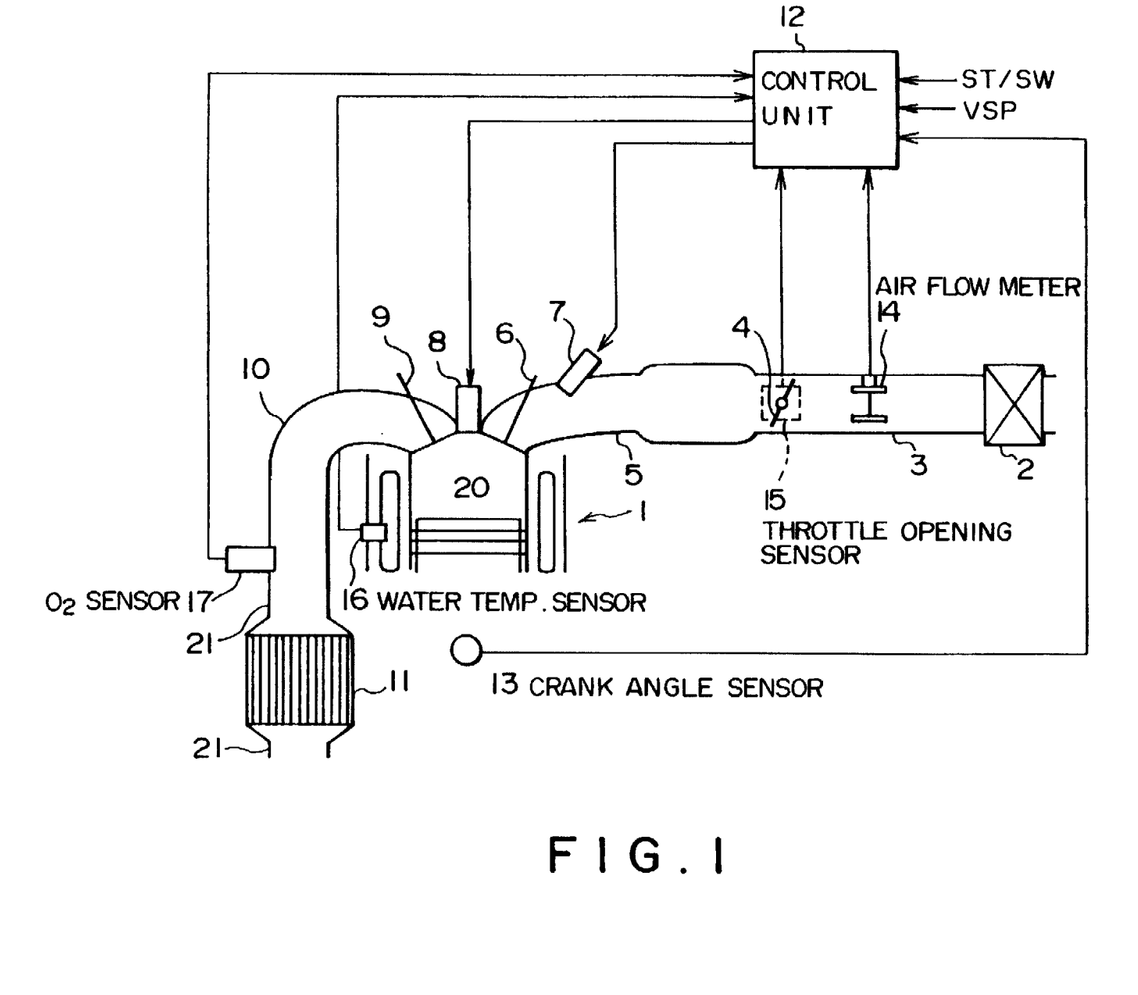
FIG. 1 is a schematic diagram of an engine controller according to this invention.

DETAILED DESCRIPTION OF THE PREFERRED EMBODIMENTS:

Referring to FIG. 1 of the drawings, air is aspirated from an air cleaner 2 to a combustion chamber 20 of each cylinder of a multi-cylinder automobile engine 1 via an intake pipe 3, throttle 4, intake manifold 5 and intake valve 6. A fuel injector 7 is installed in each branch of the manifold 5 for each of the cylinders.

The fuel injector 7 is an electromagnetic valve which opens when a solenoid is energized and closes when energization is stopped. It opens and closes according to a pulse signal input from a control unit 12. When the fuel injector 7 opens, fuel which has been transported under pressure from a fuel injection pump, not shown, via a pressure regulator, is injected from the fuel injector 7 into the intake air.

A spark plug 8 is provided in each of the combustion chambers 20. The mixture of air and injected fuel which is aspirated into each of the chambers 20 is ignited by a spark produced by the spark plug 8, and burnt.

After combustion, the exhaust is led to a catalytic converter 11 via an exhaust valve 9, exhaust manifold 10 and exhaust pipe 21. Toxic exhaust components are converted to non-toxic components in the catalytic converter 11, which are then discharged to the atmosphere via the exhaust pipe 21.

The control unit 12 comprises a microcomputer comprising a CPU, ROM, RAM, A/D converter and I/O interface. Signals are input from sensors to the control unit 12, the action of the fuel injector 7 and spark plug 8 being controlled according to these signals.

These sensors comprise a crank angle sensor 13 which detects a crank angle and an engine rotation speed Ne from the rotation of the crankshaft or cam shaft of the engine, an air flow meter 14 which detects an intake air flowrate Qa through the intake pipe 3, a throttle opening sensor 15 which detects an opening TVO of the throttle 4, a water temperature sensor 16 which detects a cooling water temperature Tw of the engine 1, and an $O_2$ sensor 17 which determines whether the air-fuel ratio of the air-fuel mixture in the combustion chamber is rich or lean from the oxygen concentration of the exhaust in the exhaust pipe 21 upstream of the catalytic converter 11. The throttle opening sensor 15 also acts as an idle switch which outputs an idle signal in the fully closed position of the throttle 4.

A start signal ST/SW from a start switch of the engine 1 and a vehicle speed VSP from a vehicle speed sensor are also input to the control unit 12.

Figure 3:
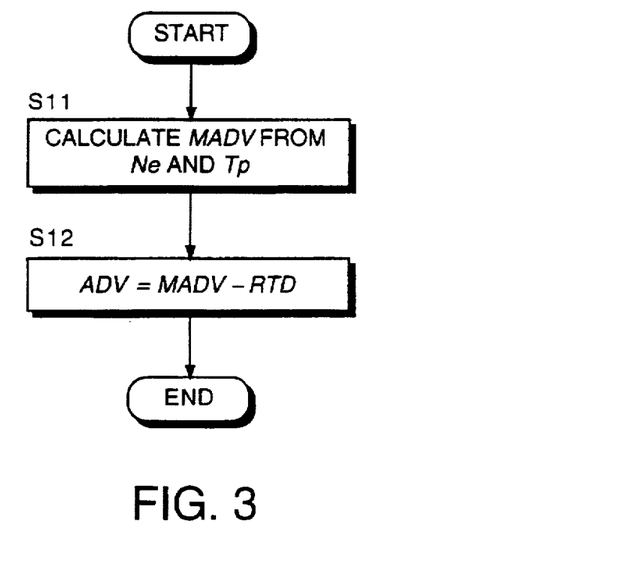
FIG. 3 is a flowchart showing an ignition timing computation process performed by the controller.
Figure 4:
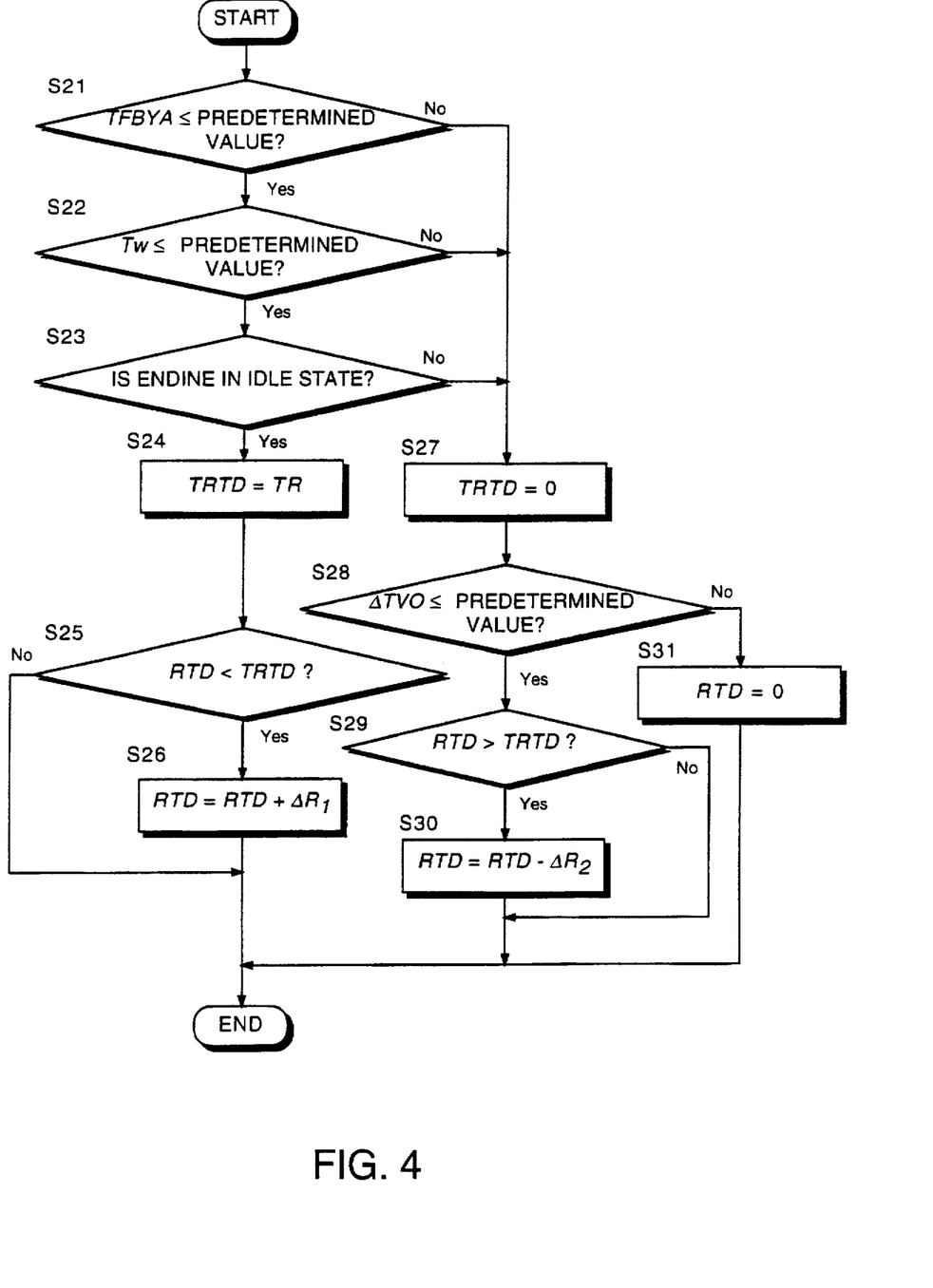
FIG. 4 is a flowchart showing a retardation amount computation process performed by the controller.
Figure 5A:
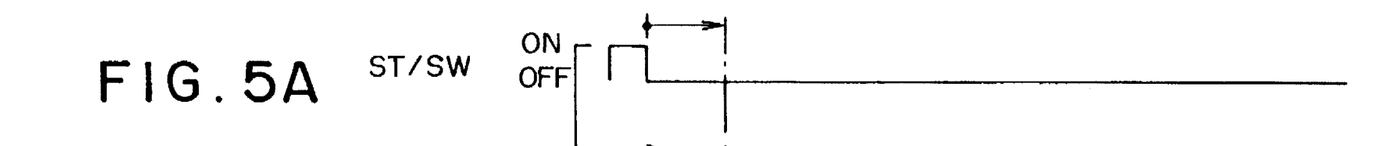
FIGS. 5A–5E are timing charts showing the variations of a fuel increase correction coefficient TFBYA and retardation amount TRD of ignition timing during cold startup according to this invention.
Figure 5B:
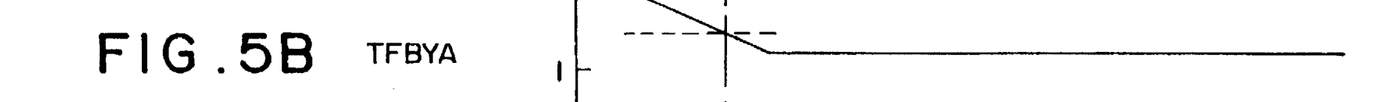
Figure 5C:
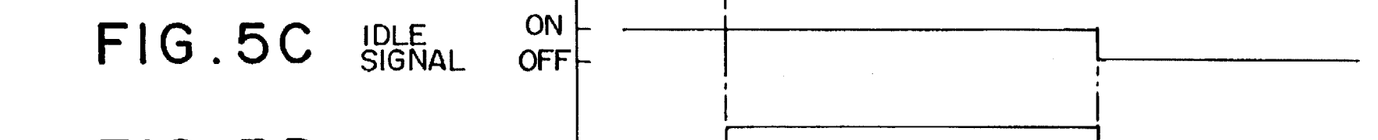
Figure 5D:
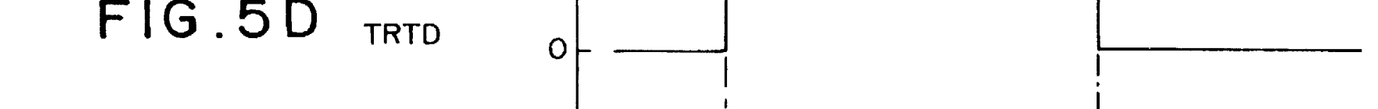
Figure 5E:
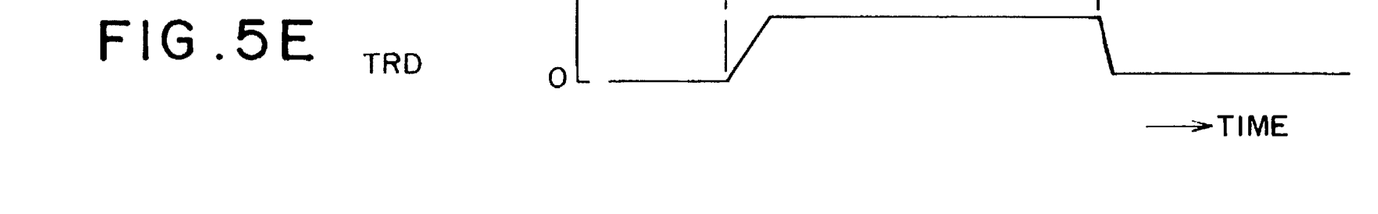

Based on these input signals, the control unit 12 controls the fuel injection amount of the fuel injector 7 to a target injection amount, and controls the ignition of the fuel-air mixture due to the spark plug 8, to a target ignition timing. After warmup of this engine 1 is complete, air-fuel ratio feedback control wherein the air-fuel ratio is controlled to near a stoichiometric air-fuel ratio, and lean control wherein the air-fuel ratio is controlled to a lean air-fuel ratio which is leaner than the stoichiometric air-fuel ratio, are performed. These modes of control are known in the art, and as they have no direct bearing on this invention, their detailed discussion will be omitted herein. The following description, which refers to the flowcharts of FIGS. 2–4, is mainly concerned with control during startup and immediately after startup.

Figure 2:
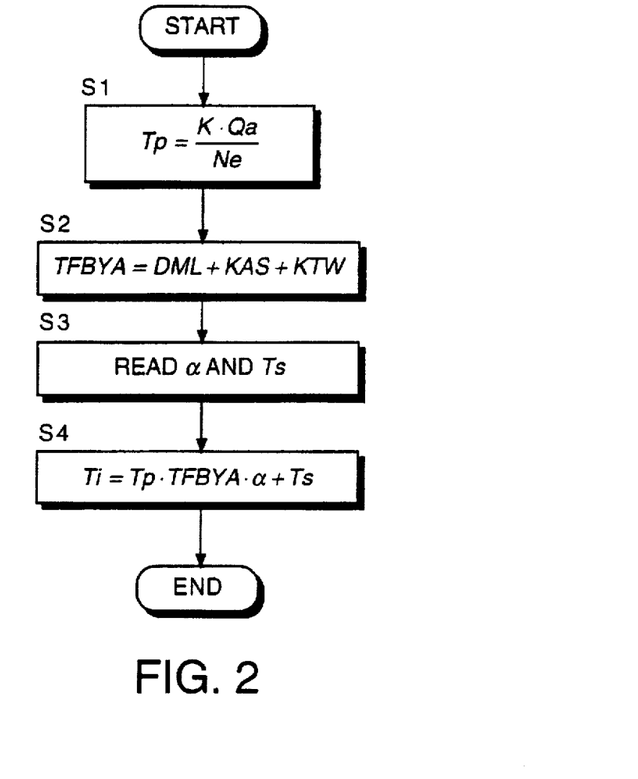
FIG. 2 is a flowchart showing a fuel injection amount computation process performed by the controller.

FIG. 2 shows the process of computing the fuel injection amount. This routine is executed at predetermined times or in synchronism with the engine rotation.

In a step S1, a basic injection pulse width Tp corresponding to a basic fuel injection amount is first calculated from the intake air amount Qa and engine rotation speed Ne by the following equation:

$$Tp = \frac{K \cdot Qa}{Ne}$$

where K is a constant.

In a step S2, the fuel increase correction coefficient TFBYA is calculated by the following equation:

TFBYA=DML+KAS+KTW

DML is an air-fuel ratio correction coefficient which is set in order to change over the air-fuel ratio between rich and lean according to engine running conditions determined by Tp and Ne after completion of warmup. Before warmup is complete, DML=1.

KAS is a post-startup increase coefficient which is set based on the cooling water temperature Tw during engine startup and the elapsed time after startup.

KTW is a water temperature increase coefficient which is set based on the cooling water temperature Tw.

In a step S3, an air-fuel ratio feedback correction coefficient a and ineffectual pulse width (battery voltage correction amount) Ts are read from maps stored in the control unit 12.

The air-fuel ratio feedback correction coefficient a is a correction coefficient for controlling the air-fuel ratio to the vicinity of the theoretical air-fuel ratio by direct proportional integral control as described in the art based on the output of the $O_2$ sensor 17. Air-fuel ratio feedback control is not performed before warmup is complete or during lean control, a being clamped at the value 1 prior to completion of warmup. The ineffectual pulse width Ts is a correction value related to the response of the fuel injector 7, and is set based on the battery voltage. Completion of warmup is determined based on the cooling water temperature Tw and the output of the $O_2$ sensor 17.

Next, in a step S4, a fuel injection pulse width Ti is calculated by the following equation:

Ti=Tp·TFBYA·α+Ts

The computed fuel injection pulse width Ti is set in a predetermined register of the control unit 12, a fuel injection signal having this pulse width is output by the fuel injector 7, and fuel injection takes place.

FIG. 3 shows the ignition timing computation process. This routine is also performed at predetermined times or in synchronism with the engine rotation.

In a step S11 a basic ignition timing MADV is calculated, referring to a map stored in the control unit 12, from the engine rotation speed Ne and basic fuel injection amount Tp which is a value representative of the engine load.

In a step S12, an ignition timing ADV is computed by subtracting a retardation amount RTD, obtained by a retardation amount computation process described hereinafter, from the basic ignition timing MADV as in the following equation:

ADV=MADV−RTD

The computed ignition timing ADV is set in a predetermined register of the control unit 12, and ignition by the spark plug 8 takes place in which energization of the ignition coil of the plug 8 is interrupted with this timing.

FIG. 4 shows a computation process of this retardation amount RTD. This routine is also performed at predetermined times or in synchronism with the engine rotation.

First, in a step S21, it is determined whether or not a fuel increase correction coefficient TFBYA is equal to or less than a predetermined value. When it is equal to or less than this predetermined value the routine proceeds to a step S22, and when it exceeds this predetermined value, i.e. when the air-fuel ratio is richer than a predetermined level, the routine proceeds to a step S27.

In the step S22, it is determined whether or not the cooling water temperature Tw is equal to or less than a predetermined value. When it is equal to or less than this predetermined value, the routine proceeds to a step S23, and when it exceeds this predetermined value, the routine proceeds to the step S27.

In the step S23, it is determined whether or not the engine is in the idle state. The idle state referred to herein is a state where the aforesaid idle signal is ON and the vehicle speed VSP is equal to or less than a predetermined value. When the vehicle is in this idle state the routine proceeds to a step S24, and when the vehicle is not in this idle state, the routine proceeds to the step S27.

In the step S24, a target retardation amount TRTD is set to TR to perform retardation correction.

Further in a step S25, the present retardation angle RTD and target retardation angle TRTD are compared. Exclusively when RTD<TRTD, the routine proceeds to a step S26, and the retardation amount RTD is increased by an amount $\Delta R_1$ above the present value. Hence, when retardation correction begins, the ignition timing is gradually retarded, and impairment of engine drivability due to rapid change of ignition timing is prevented. When RTD$\geq$TRTD, the routine is terminated without correcting the retardation amount RTD.

On the other hand, when the routine proceeds to the step S27 in the aforesaid process, retardation correction of the ignition timing is basically not performed. In this case, the target retardation angle TRTD is reset to 0.

In the next step S28, it is determined whether or not a change $\Delta TVO$ of the throttle opening TVO is equal to or less than a predetermined value, and when it is equal to or less than this value, the routine proceeds to a step S29.

In the step S29, the present retardation angle RTD and the target retardation angle TRTD which was set to 0 are compared. Exclusively when RTD>TRTD, the routine proceeds to a step S30 and the retardation amount RTD is made to approach 0 by subtracting $\Delta R_2$ from the present value. These steps are intended to return the ignition timing gradually to 0 from a retarded state even when retardation correction has terminated, and prevent impairment of engine drivability due to rapid change of the ignition timing. It is also arranged that $\Delta R_2 \geq \Delta R_1$.

In the determination of the step S28, when $\Delta TVO>$ predetermined value, this indicates that the engine 1 is rapidly accelerating. In this case, the routine proceeds to a step S31, and jumps of acceleration are prevented by setting the retardation angle RTD immediately to 0.

In the aforesaid control process, during the idle period from startup to completion of warmup of the engine 1, retardation of the ignition timing is not performed when the fuel increase correction coefficient TFBYA is large as shown in FIGS. 5A-5E. However, when TFBYA is equal to or less than a predetermined value, the ignition timing is gradually retarded to a predetermined value. When the idle state terminates, ignition timing control also terminates, but in this case too the ignition timing is smoothly returned to 0 without any sharp variation.

Figures 6A, 6B:
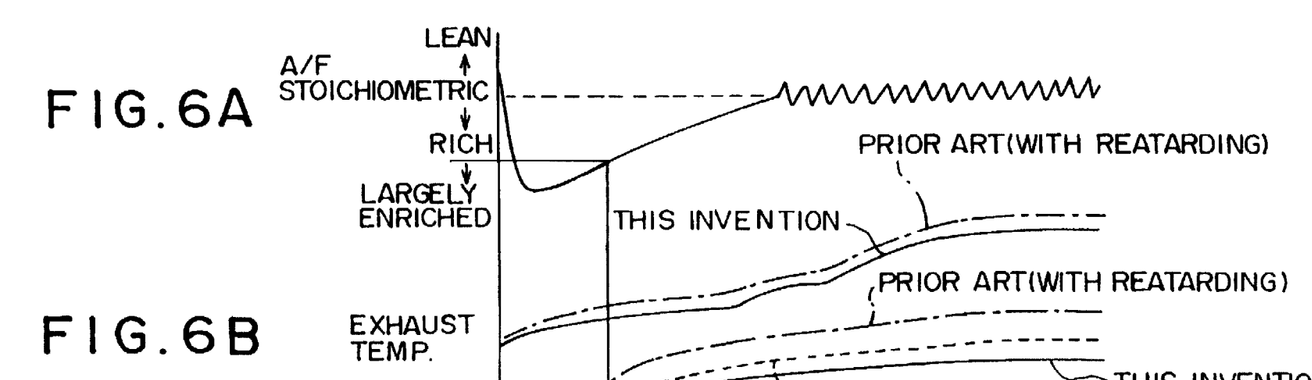
FIGS. 6A–6C are timing charts comparing exhaust temperature and cumulative HC discharge amount according to this invention with the prior
Figure 6C:
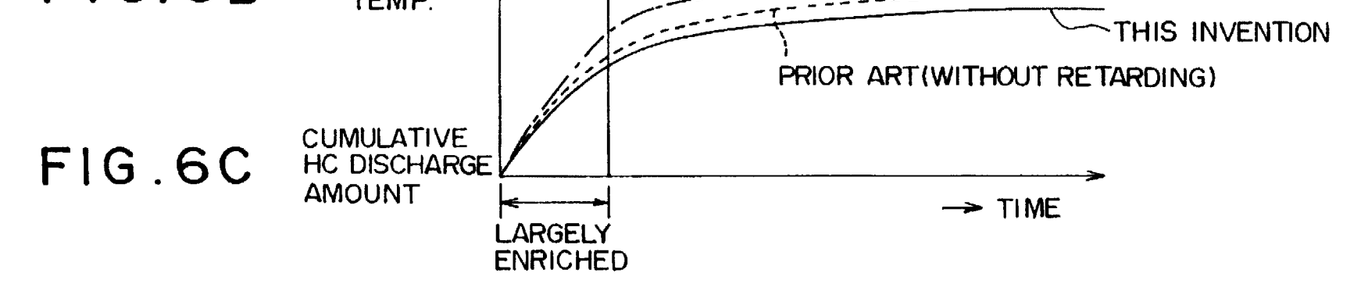

As a result, as shown in FIGS. 6A-6C, during the period when the air-fuel ratio is much richer during and immediately after startup, retardation correction of the ignition timing is not performed. The discharge amount of HC in this period is therefore considerably reduced compared to the aforesaid conventional device wherein, even during this period, the ignition timing is retarded. Hence, the total discharge amount of HC until warmup is complete is less than in the conventional case.

Figure 7:
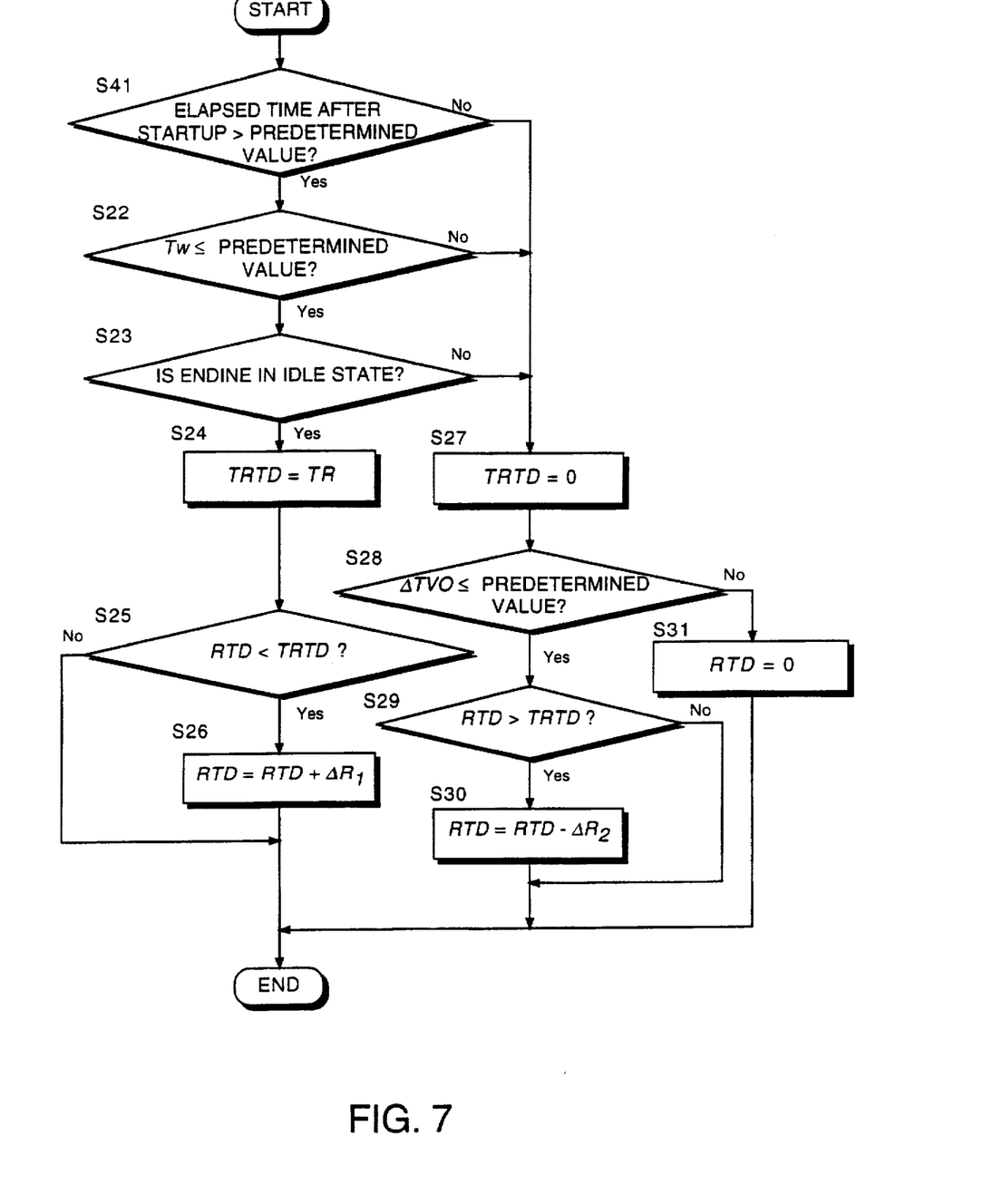
FIG. 7 is similar to FIG. 4, but showing another embodiment of this invention.

FIG. 7 shows another embodiment of this invention relating to the computation of retardation angle.

Herein the difference from the flowchart of FIG. 4 is that a step S41 is provided instead of the step S21. In the step S21 a very rich period was detected by the fuel increase correction coefficient TFBYA, however in the step S41, this is determined by the elapsed time after startup.

In other words, the control unit 12 counts the elapsed time after the start signal ST/SW is input. When this elapsed time is within a predetermined value, it is determined that the vehicle is in a very rich period, the routine proceeds to the step S27, and retardation of the ignition timing is not performed. When the elapsed time exceeds the predetermined value, it is determined that the very rich period has terminated, and the processing of the step S22 and subsequent steps is performed. According to this embodiment, the detection of very rich periods is easier.

The embodiments of this invention in which an exclusive property or privilege is claimed are defined as follows:

What is claimed is:

1. A controller for use with a spark ignition engine comprising:

means for increasing fuel supply to said engine so as to make an air-fuel ratio of air-fuel mixture supplied to said engine richer than a stoichiometric air-fuel ratio during cold startup of said engine, means for retarding an ignition timing of said air-fuel mixture during cold startup, means for determining whether or not the air-fuel ratio of said air-fuel mixture is richer than a predetermined level, said predetermined level being richer than said stoichiometric air-fuel ratio, and means for prohibiting retardation of ignition timing by said retarding means when the air-fuel ratio is richer than said predetermined level.

2. A controller as defined in claim 1, wherein said determining means comprises means for determining whether or not an increase amount due to said increasing means is greater than a predetermined value.

3. A controller as defined in claim 1, wherein said determining means comprises means for determining whether or not an elapsed time from startup of said engine has exceeded a predetermined value.

4. A controller as defined in claim 1, further comprising means for determining whether or not an idle running state of said engine has terminated, and means for gradually returning the ignition timing retarded by said retarding means to a non-retarded state when the idle running state has terminated.

5. A controller as defined in claim 4, wherein said retarding means further comprises means for gradually retarding the ignition timing at a first rate and wherein said gradually returning means comprises means for returning the ignition timing at a second rate which is larger than or equal to the first rate.

6. A controller as defined in claim 4, further comprising means for determining whether or not said engine is in a predetermined acceleration state, and means for immediately returning the ignition timing retarded by said retarding means to the non-retarded state when said engine is in said predetermined acceleration state.

7. A controller as defined in claim 1, further comprising means for determining whether or not a cooling water temperature of said engine has exceeded a predetermined value, and means for gradually returning the ignition timing retarded by said retarding means to a non-retarded state when the cooling water temperature has exceeded said predetermined value.

8. A controller as defined in claim 7, wherein said retarding means further comprises means for gradually retarding the ignition timing at a first rate and wherein said gradually returning means comprises means for returning the ignition timing at a second rate which is larger than or equal to the first rate.

* * * * *